US006388777B1

(12) United States Patent
Miyajima

(10) Patent No.: US 6,388,777 B1
(45) Date of Patent: May 14, 2002

(54) DIGITAL IMAGE READING APPARATUS

(75) Inventor: Masami Miyajima, Yokohama (JP)

(73) Assignee: Ricoh Corporation, Ltd., Tokyo (JP)

( * ) Notice: Subject to any disclaimer, the term of this patent is extended or adjusted under 35 U.S.C. 154(b) by 0 days.

(21) Appl. No.: 09/210,853

(22) Filed: Dec. 15, 1998

(30) Foreign Application Priority Data

Dec. 15, 1997 (JP) ............................................. 9-344627

(51) Int. Cl.⁷ .............................. H04N 1/04; H04N 1/32
(52) U.S. Cl. ....................... 358/486; 358/412; 358/442; 358/497; 358/468
(58) Field of Search ................................. 358/412, 413, 358/497, 496, 442, 444, 404, 486, 468

(56) References Cited

U.S. PATENT DOCUMENTS

| 5,517,331 A | * | 5/1996 | Murai et al. | 358/486 |
| 5,572,335 A | * | 11/1996 | Stevens | 358/442 |
| 5,825,512 A | * | 10/1998 | Okita | 358/496 |
| 6,160,636 A | * | 12/2000 | Nagano et al. | 358/412 |

* cited by examiner

*Primary Examiner*—Cheukfan Lee
(74) *Attorney, Agent, or Firm*—Oblon, Spivak, McClelland, Maier & Neustadt, P.C.

(57) ABSTRACT

A digital image reading apparatus including a reading device which reads an original document to obtain image data; a sub-scanning speed setting device which selectively sets a reading speed of the reading device in a sub-scanning direction; a data transfer device which transfers the obtained image data to an external device connected with the digital image reading apparatus with a communications device; a data rate adjusting device which determines a data rate between the digital image reading apparatus and the external device through a communications operation with the external device; and an image parameter setting device which sets at least one parameter relating to a read image on the basis of the communications operation with the external device, wherein, the sub-scanning speed setting device sets the reading speed of the reading device in the sub-scanning direction according to a value of the set parameter relating to the read image determined by the image parameter setting device.

20 Claims, 2 Drawing Sheets

DIGITAL IMAGE READING APPARATUS

BACKGROUND OF THE INVENTION

1. Field of the Invention

The present invention relates to a digital image reading apparatus such as an image scanner that is used in connection with external devices including a host machine, such as a personal computer, a printer, and so forth.

2. Discussion of the Background

Generally, this kind of digital image reading apparatus includes an interface unit that conforms to a SCSI (Small Computer Standard Interface), which is a known popular interface for interfacing external devices.

An original document reading speed of such a digital image reading apparatus that uses the SCSI interface unit to transfer image data to the external device is determined according to a preset reading density. On the other hand, when the digital image reading apparatus transfers the image data upon reading an original document at a reading speed, the data rate for the image data to the external device is determined according to the data processing speed of the external device.

Accordingly, when transferring a certain amount of image data which is defined by reading density and an area to read, the digital image reading apparatus may not have a delay in transferring the image data to the external device if the data rate is faster than the reading speed. However, if the data rate is slower than the reading speed, the digital image reading apparatus is required to have an image memory made of a DRAM (dynamic random access memory) or the like into which the image data is temporarily stored so as to be transferred to the external device free from the fast reading speed but in synchronism with the data processing speed of the external device.

For this reason, the digital image reading apparatus is generally configured to perform the following two operations in parallel when transferring the read image data to the external device. One operation is to temporarily store the image data read by the digital image reading apparatus into the image memory made of DRAM or the like. The other operation is to transfer the image data from the image memory to the external device.

However, when the speed of storing the image data into the image memory is faster than the speed of transferring the image data to the external device or when the reading density is relatively high, an amount of the image data accumulated in the image memory will gradually be increased. In this case, the reading operation needs to be stopped before the image memory is filled with the image data.

In the digital image reading apparatus, a stepping motor is generally used as a driving motor for the image reading operation. Since the stepping motor cannot be stopped instantaneously due to its operational characteristic, a so-called "through-down" operation, which is a control method for gradually slowing down the driving motor, is adopted. During the time of temporary stop of the reading operation made by the through-down operation, the digital image reading apparatus continues to transfer the image data accumulated in the image memory. When a sufficient amount of the image data accumulated in the image memory is transferred to the external device, the digital image reading apparatus drives the driving motor so as to restart the reading operation. At this time, since the drive motor cannot be started instantaneously due to its operational characteristic, a so-called "through-up" operation, which is a control method for gradually speeding up the motor, is adopted.

Therefore, when the data rate between the digital image reading apparatus and the external device is relatively slower than that of the image data storing operation, the digital image reading apparatus that includes the SCSI interface unit as standard equipment may need to perform the through-down and through-up operations a number of times during one reading operation. As a result, image quality will be reduced in this case since quality of the image read in a constant speed is better than that read with a number of through-down and through-up operations. That is, a high quality image cannot be obtained by reading the image under a condition of intermittent operations of the drive motor. The number of occurrences of the through-down and through-up operations can be decreased by, for example, extending the capacity of the image memory such as DRAM. However, in this case, the user needs to bear an additional cost due to the extension of the image memory.

SUMMARY OF THE INVENTION

In light of the above problems, an object of the present invention is to provide a novel digital image reading apparatus that is capable of controlling a driving motor to reduce the number of through-down and through-up operations during a reading operation with a relatively low cost increase.

To that end, the novel digital image reading apparatus of the present invention includes a reading device which reads an original document to obtain image data; a sub-scanning speed setting device which selectively sets a reading speed of the reading device in a sub-scanning direction; a data transfer device which transfers the obtained image data to an external device connected with the digital image reading apparatus with a communications device; a data rate adjusting device which determines a data rate between the digital image reading apparatus and the external device through a communications operation with the external device; and an image parameter setting device which sets at least one parameter relating to a read image on the basis of the communications operation with the external device, wherein, the sub-scanning speed setting device sets the reading speed of the reading device in the sub-scanning direction according to a value of the set parameter(s) relating to the read image determined by the image parameter setting device.

The sub-scanning speed setting device of the digital image reading apparatus of the present invention may set the reading speed of the reading device in the sub-scanning direction in accordance with a value of the parameter related to a main scanning area.

The sub-scanning speed setting device of the digital image reading apparatus may set the reading speed of the reading device in the sub-scanning direction in accordance with a value of the parameter related to a resolution in the sub-scanning direction.

The sub-scanning speed setting device of the digital image reading apparatus may set the reading speed of the reading device in the sub-scanning direction in accordance with a value of the parameter related to whether the image data is binary-valued or multiple-valued.

The sub-scanning setting device of the digital image reading apparatus may set the reading speed of the reading device in the sub-scanning direction in accordance with plural parameter values related to the main scanning area, to the sub-scanning area and/or to whether the image data is binary-valued or multiple-valued, respectively.

The communication device of the novel digital image reading apparatus may conform to a SCSI standard.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
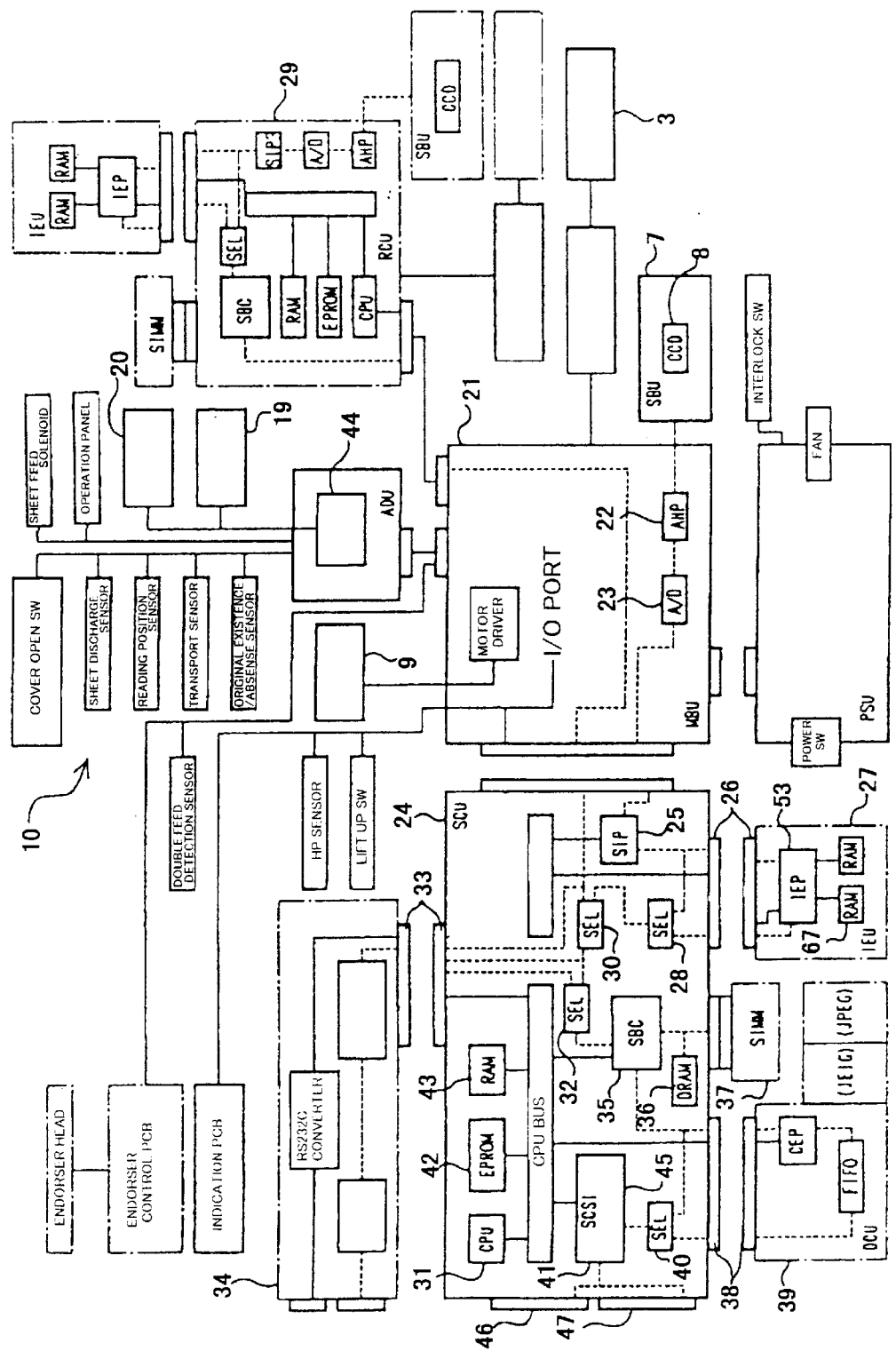
FIG. 1 is a block diagram of an electric system of an image scanner according to an embodiment of the present invention.

Referring now to the drawings, wherein like reference numerals indicate identical or corresponding parts throughout the several views, one example of a digital image reading apparatus according to an embodiment of the present invention, i.e., an image scanner including a SCSI (Small Computer Standard Interface) interface unit which conforms to a SCSI (Small Computer Standard Interface) as standard equipment, is described. An electrical block diagram is shown in FIG. 1, and mechanical construction and operation is described referring to FIG. 2.

Figure 2:
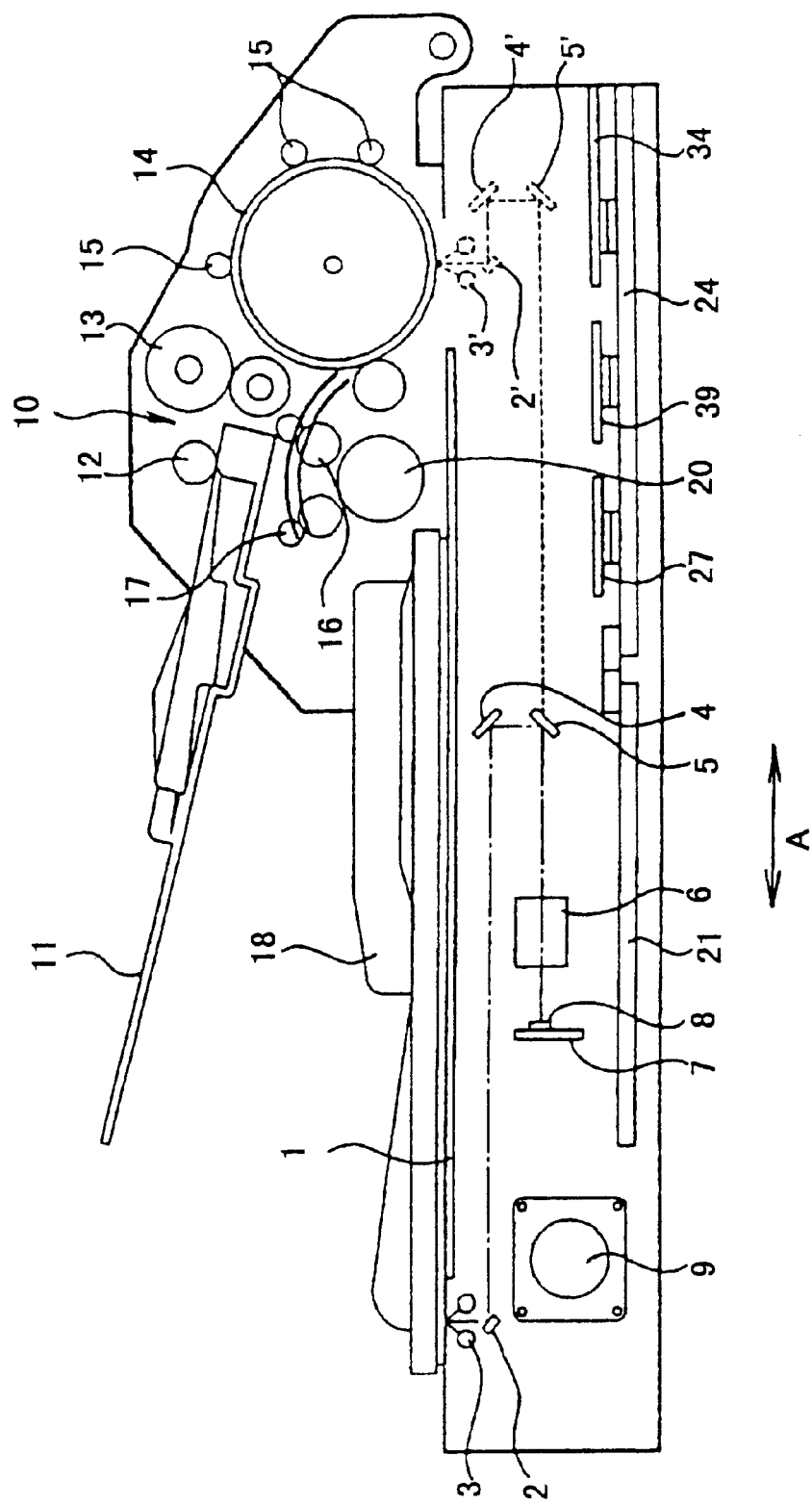
FIG. 2 is a schematic elevation showing a structure of the image scanner of FIG. 1.
Figure 1:
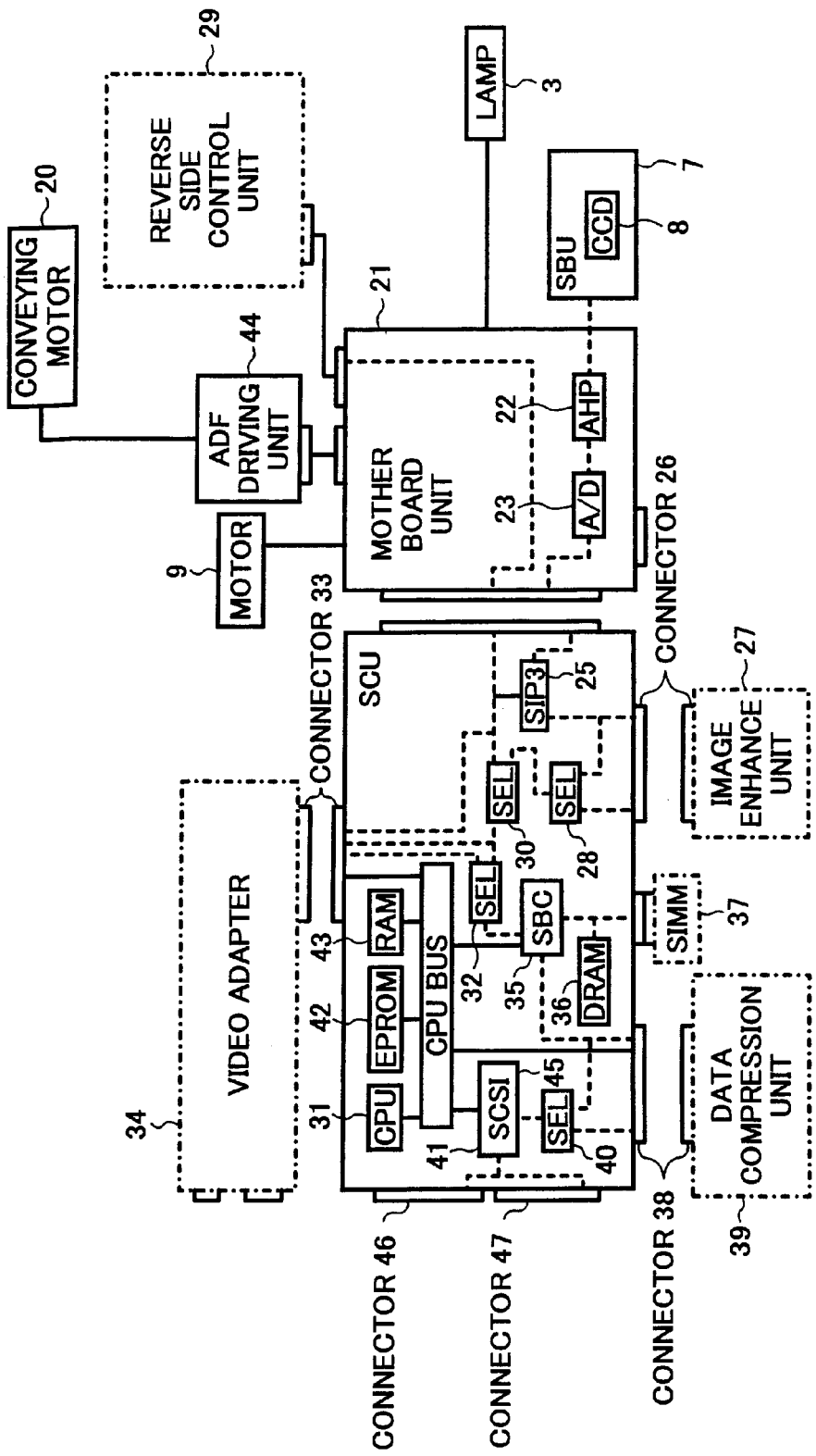
Figure 2:
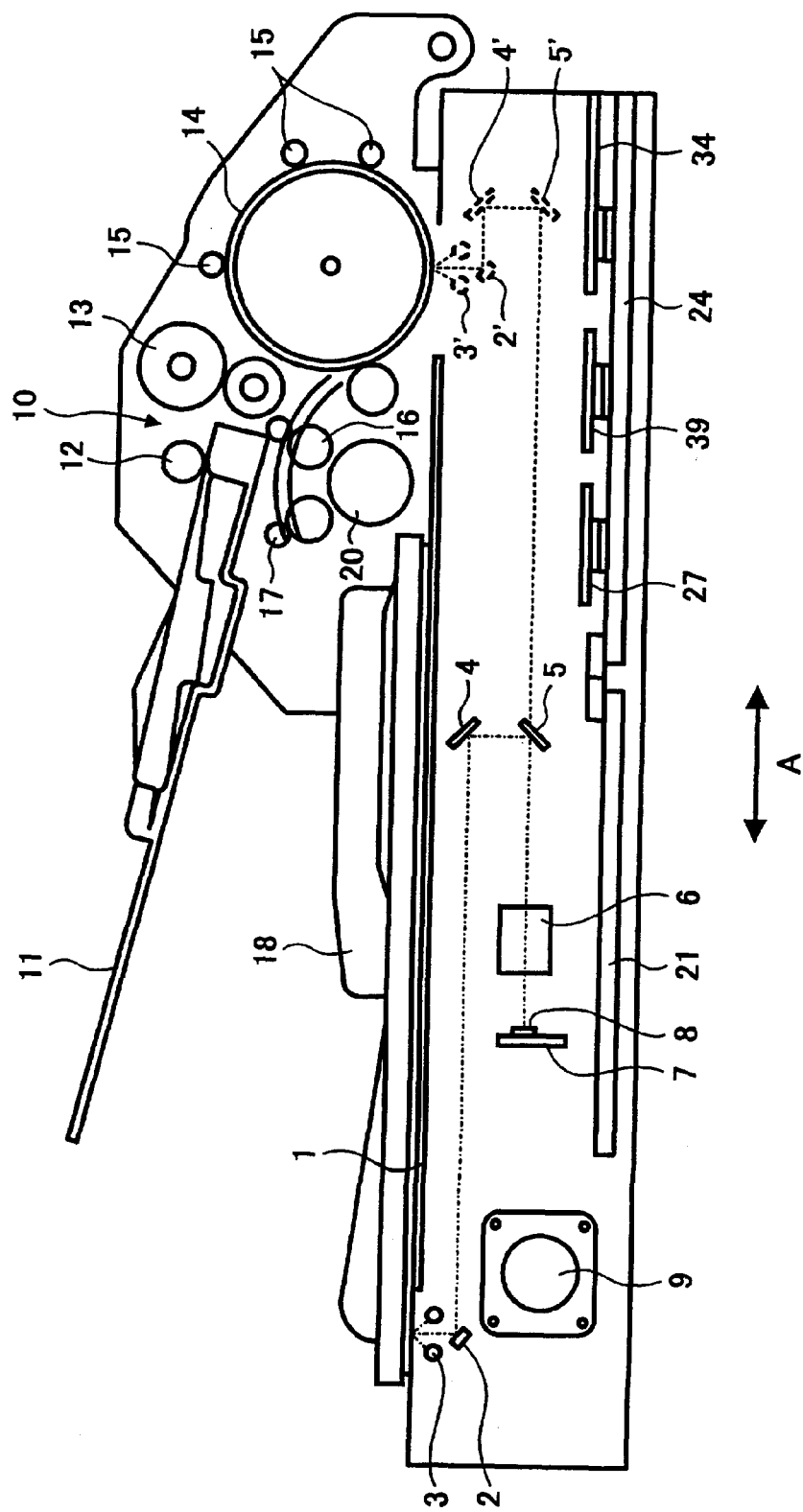

As evident from FIG. 2, an original document mounted on a contact glass (not shown) is irradiated and scanned by an illumination lamp 3 assembled in a body with a first mirror 2. A reflecting light from the original document is focussed on one dimension CCD (charge coupled device) 8 mounted on an SBU (sensor board unit) 7 via the first mirror 2, a second mirror 4 and a third mirror 5 that move in the same direction with half of a moving speed of the first mirror 2, and a focussing lens 6. The first mirror 2 and the illumination lamp 3 are defined as a first moving member, and a combination of the second mirror 4 and the third mirror 5 are defined as a second moving member. Both of the moving members are held for reciprocation relative to a main body in a direction indicated by an arrow A, as a sub-scanning direction in a speed ratio of 2:1 being driven by a moving member motor 9 as a driving source.

On the other hand, in the image scanner, a reading mode is prepared for reading the original document, which is being conveyed by an ADF (Automatic Document Feeder) 10, by moving the aforementioned reading optical system toward the right side end of the FIG. 2, as shown by reference numerals 2' to 5', and by maintaining the reading optical system at the same position, other than the reading operation of the original document mounted on the contact glass 1.

The ADF 10 conveys the original document mounted on an original tray 11 through a pickup roller 12, a pair of registration rollers 13, a conveying drum 14 and a plurality of conveying rollers 15 located around the conveying drum 14 and a conveying and reading position B. Thereafter, the ADF 10 discharges the original document through a plurality of pairs of sheet discharge rollers 16 and 17 to a sheet discharge tray 18. The illuminating lamp 3' illuminates the original document that passes through the conveying and reading position B.

Thereby, the reflection light from the original document irradiated by the illuminating lamp 3' is focussed on the CCD 8 passing through first to third mirrors 2', 4', and 5', and through a focussing lens 6, and is read by the CCD 8.

At the ADF 10, the pickup roller 12 and the pair of registration rollers 13 are driven by a sheet feeding motor (not shown), and the conveying drum 14, the plurality of conveying rollers 15, and the plurality of pairs of sheet discharge rollers 16 and 17 are driven by a conveying motor 20.

Next, an exemplary electric system of the above-mentioned mechanical structure of the image scanner is described referring to FIG. 1. Reflection light of the original document falls onto the CCD 8 mounted on a SBU 7 and, in the CCD 8, the light is converted into an analog signal that has a voltage value corresponding to intensity of the light. The analog signal converted from the reflection light is then divided into odd-numbered-bit and even-numbered-bit signals, which are sequentially output to a MBU (Mother Board Unit) 21.

In the MBU 21, a dark potential part is removed from these odd-numbered-bit and even-numbered-bit signals by an AHP (Analog data Handling Peripheral) 22. Then, odd-numbered-bit and even-numbered-bit signals are merged into one image signal in the MBU 21. After a gain of the image signal is adjusted to a predetermined amplitude, the image signal is input into an A/D (analog-to-digital) converter 23 and is quantized.

The image signal quantized by the MBU 21 is binarized after receiving various operations, such as a shading correction, a gamma correction, and a MTF (modulation transfer function) correction, performed by SIP (Scanner Imaging Peripheral) 25. The binarized image signal is then output as a video signal with a page synchronous signal for aligning the image signal in a main-scanning direction, a line synchronous signal for aligning the image signal in a sub-scanning direction, and an image clock signal. The image signal (video signal) output from the SIP 25 is input into an IEU (Image Enhance Unit) 27 through a connector 26. The video signal receives a certain image processing operation in the IEU 27, and is returned to the SCU 24.

A function of a reading device that obtains a digital like image data by photoelectrically reading the original document image is realized by a construction shown in FIG. 2 and the processing devices from the CCD 8 to the MBU 21. The video signal that is again inputted to the SCU 24 is inputted to a selector 28. The video signal from the SIP 25 is also inputted to another input terminal of the selector 28, and the selector 28 is constructed to be able to select either the image processing operation which is executed to the video signal from the SIP 25 by the aforementioned IEU 27 or not.

The output of the selector 28 is inputted to a selector 30 that includes an input from an RCU (Reverse side Control Unit) 29 as another input signal so that a read surface of the original document can be selected. The RCU 29 is an optional unit to control a reading operation for reading the reverse side of the original document, when both sides of the original document is simultaneously read by the CCD 8 or the like as described earlier.

Further, the RCU 29 is controlled by a CPU 31 in the aforementioned SCU 24 using a serial communication, and the read image data of the reverse side of the original document is transferred to the SCU 24 through the aforementioned MBU 21 as a video signal. An output side of the video signal from the aforementioned selector 30 is connected to the selector 32 and a connector 33. Another input signal of the selector 32 is a video signal from a video adapter 34. Thereby, the video adapter 34 can be connected to a tip end of the connector 33. On the other hand, an output of the video signal of the selector 32 is inputted to an SBC (Scan Buffer Controller) 35.

The video signal outputted from the SIP 25 is inputted to the SBC 35 that manages a DRAM 36 through the construction and a path as mentioned above, and stored in an image memory that includes a SIMM (Single Inline Memory Module) 37 composed of an extension RAM option.

Further, a DCU (Data Compression Unit) 39 for compressing the image data inputted into the connector 38 is connected to the connector 38. The image data compressed by the DCU 39 becomes one side input of a selector 40 of the SCU 24 so that the image data can be selected either to be compressed or not. The image data output from the selector 40 is transmitted to an external device (not shown) such as a personal computer, a printer, or the like through a SCSI controller 41.

A CPU 31, an EPROM 42, and a RAM 43 are provided on the SCU 24 as standard equipment, and they control the SCSI controller 41 to have a communication with the external device. Further, the CPU 31 operates a timing control of the moving member motor 9 composed of a stepping motor, a sheet feeding motor, and a conveying motor 20. Furthermore, an ADU (ADF Driving Unit) 44 connected to the MBU 21 has a function for relaying a power supply operation of electric system parts that are used for the ADF 10.

The SCSI controller 41 executes a function of a data transfer device that transfers the obtained digital like image data to the external device, and includes a SCSI controller 45 and, for example, both of SCSI connectors 46 and 47. The SCSI controller 45 is connected to a CPU bus in the SCU 24 and transfers the image data transmitted from the selector 40 to the external device through, for example, SCSI connector 46 or 47, and a SCSI cable (not shown). Thus, the SCSI, a universal interface in this kind of devices, is used as a communication device to the external device.

Data transfer methods on the SCSI as mentioned above are classified into two types, i.e., a non-synchronous transfer as a basic method, and a synchronous transfer that can be operated at a high speed, on the basis of a transfer speed. The non-synchronous transfer is the basic transfer method, and an information transfer (for example, a message transfer or a status transfer) other than the data transfer is performed by this transfer method. More particularly, the non-synchronous transfer is performed by a handshake (repetition of sending and receiving operation) of a REQ/ACK (Request and Acknowledge) signal, and for example, a transfer speed of about 1.5 mega bytes/second can be realized in this transfer method.

On the other hand, the synchronous transfer is a mode that can be used in a data phase and is provided for high speed data transfer. Thereby, an agreement between a target and an initiator is required for utilizing the synchronous transfer mode at a data transfer. The agreement is performed by determining two values as "a REQ/ACK offset value" and "a minimum transfer synchronization" according to a transmission of a message named "a Synchronous Data Transfer Request." A high transfer speed of about 10 mega bytes can be realized in this transfer method.

In case of applying the aforementioned data transfer method on the SCSI to the present embodiment, the CPU 31 performs the synchronous transfer of the image data according to a pre-set transfer period by controlling the SCSI controller 45, and by receiving a synchronous data transfer message that is transmitted from the external device through the SCSI connector 46 or 47.

A register (not shown) for setting the transfer period is prepared on the SCSI controller 45, and the transfer period is set by executing a writing operation to the register with the CPU 31. At the same time, a mode setting for the synchronous/non-synchronous mode is performed according to a content of a synchronous data transfer message. Hereupon, under a control of the CPU 31, a function of the data rate adjusting device for the image data for determining the transfer period (the data rate of the image data) corresponding to the synchronous data transfer message is performed. Thereby, a data transfer amount is recognized by the data rate adjusting device for the image data. Even though the quantized image data is inputted to the SIP 25 in a line unit as mentioned above, a line period of the inputted image data is constant regardless of the reading image density.

Other than the above description, a sub-scanning speed setting device that selectively sets a reading speed when reading the original document (regardless of the original document fixing method or the original document conveying method) in a sub-scanning direction is provided in the image scanner of the present embodiment as a function performed under a control of the CPU 31. Further, the image scanner is also provided with an image parameter setting device that sets a parameter relating to the read image on the basis of the communication with the external device. The parameter relating to the read image includes the number of pixels in a main scanning area, a resolution in the sub-scanning direction, image composition (binary value or multiple value) or the like.

In such a construction in the present embodiment, when operating the image reading process for sequentially transferring the image data to the external device reading the original document, the CPU 31 functions to set the reading speed in the sub-scanning direction by controlling the sub-scanning speed setting device corresponding to the parameter relating to the read image, which is determined by the image parameter setting device.

Namely, if the read data amount in the CCD 8 side is made equal to or close to the data transfer amount that is recognized by the data rate adjusting device for the image data, the image data amount stored in the DRAM 36 rarely increases. Accordingly, even though the system has an inexpensive construction with a decreased memory capacity of the DRAM or the like mounted on the image sensor, the image can be read without a deterioration of the image, since a possibility of a temporary stop at a time of the reading operation is decreased.

More particularly, since the read data amount is a product of the number of pixels in the main scanning area, the image composition (in case of binary value: $1/8$, in case of multiple value: 1), the resolution in the sub-scanning direction (dpi: dot per inch), and the reading speed in the sub-scanning direction, the reading speed in the sub-scanning direction is set so that the data transfer amount becomes equal to the read data amount by using the number of the pixels in the main scanning area, the image composition, and the setting value of the parameter, which is the resolution in the sub-scanning direction.

At this moment, since a synchronous data transfer requirement message at the SCSI is used, the aforementioned effect is obtained without adding a special construction to the SCSI, which is a most general communication device for this kind of image scanner in the present embodiment.

The controller of this invention may be conveniently implemented using a conventional general purpose digital microprocessor programmed computer according to the teachings of the present specification, as is apparent to those skilled in the computer technology. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

This application is based on Japanese patent applications JPAP09-344627 filed on Dec. 15, 1997, the entire contents of which are hereby incorporated by reference.

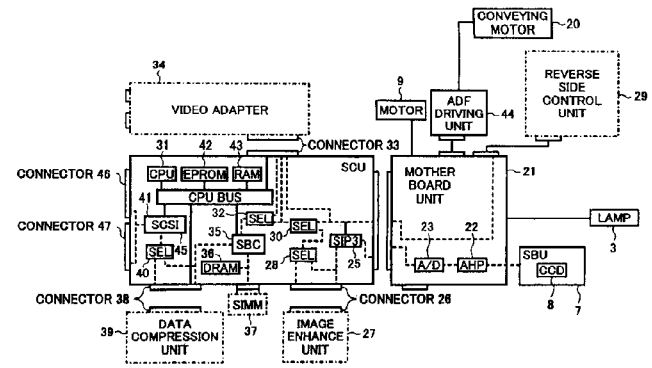

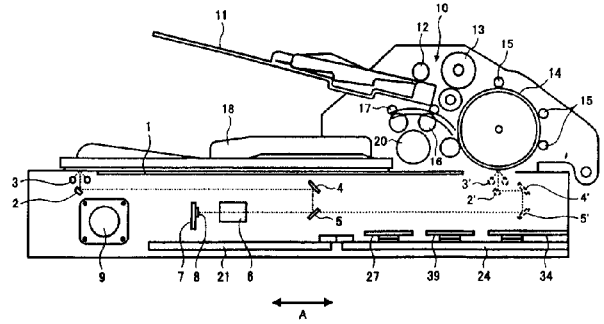

What is claimed as new and desired to be secured by Letters Patent of the United States is:

1. A digital image reading apparatus comprising:
   a reading device configured to read an original document to obtain image data;
   a sub-scanning speed setting device configured to selectively set a reading speed of said reading device in a sub-scanning direction;
   a data transfer device configured to transfer said obtained image data at a predetermined data rate to an external device connected with said digital image reading apparatus with a communications device;
   a data rate adjusting device configured to determine said predetermined data rate between said digital image reading apparatus and said external device through a communications operation with said external device; and
   an image parameter setting device configured to determine at least one parameter relating to a read image in which to set, and to set a value of the at least one parameter on the basis of said communications operation with said external device,
   wherein said sub-scanning speed setting device is configured to set said reading speed of said reading device in said sub-scanning direction according to the value of said at least one parameter relating to said read image determined by said image parameter setting device.

2. The digital image reading apparatus according to claim 1, wherein said image parameter setting device is configured to set a first parameter related to a main scanning area and said sub-scanning speed setting device is configured to set said reading speed of said reading device in said sub-scanning direction in accordance with the value of said first parameter.

3. The digital image reading apparatus according to claim 2, wherein said image parameter setting device is configured to set a second parameter related to a sub-scanning area and said sub-scanning speed device is configured to set said reading speed of said reading device in said sub-scanning direction in accordance with the values of said first and second parameters.

4. The digital image reading apparatus according to claim 3, wherein said image parameter setting device is configured to set said first and second parameters in relation to whether the image data is binary-valued or multiple-valued and said sub-scanning speed setting device is configured to set said reading speed of said reading device in said sub-scanning direction in accordance with the values of said first and second parameters.

5. The digital image reading apparatus according to claim 3, wherein said communication device conforms to a SCSI standard.

6. The digital image reading apparatus according to claim 2, wherein said image parameter setting device is configured to set said first parameter in relation to whether the image data is binary-valued or multiple-valued and said sub-scanning speed setting device is configured to set said reading speed of said reading device in said sub-scanning direction in accordance with the value of said first parameter.

7. The digital image reading apparatus according to claim 2, wherein said communications device conforms to a SCSI standard.

8. The digital image reading apparatus according to claim 1, wherein said image parameter setting device is configured to set a first parameter related to a sub-scanning area and said sub-scanning speed setting device is configured to set said reading speed of said reading device in said sub-scanning direction in accordance with the valve of said first parameter.

9. The digital image reading apparatus according to claim 8, wherein said image parameter setting device is configured to set said first parameter in relation to whether the image data is binary-valued or multiple-valued and said sub-scanning speed setting device is configured to set said reading speed of said reading device in said sub-scanning direction in accordance with the value of said first parameter.

10. The digital image reading apparatus according to claim 8, wherein said communications device conforms to a SCSI standard.

11. The digital image reading apparatus according to claim 1, wherein said image parameter setting device is configured to set a first parameter in relation to whether the image data is binary-valued or multiple-valued and said sub-scanning speed setting device is configured to set said reading speed of said reading device in said sub-scanning direction in accordance with the valve of said first parameter.

12. The digital image reading apparatus according to claim 1, wherein said communications device conforms to a SCSI standard.

13. A method for transferring read image data from a digital reading apparatus to an external device comprising the steps of:
    reading an original document to obtain image data;
    determining a data rate between said digital image reading apparatus and said external device through a communications operation with said external device;
    determining at least one parameter relating to a read image in which to set, and setting a value of the at least one parameter on the basis of said communications operation;
    setting a reading speed in a sub-scanning direction according to the value of said at least one parameter;
    transferring said obtained image from said digital image reading apparatus to said external device.

14. The method for transferring read image data as claimed in claim 13, wherein a first parameter is set in relation to a main scanning area and said reading speed in said sub-scanning direction is set in accordance with the value of said first parameter.

15. The method for transferring read image data as claimed in claim 14, wherein a second parameter is set in relation to a sub-scanning area and said reading speed in said sub-scanning direction is set in accordance with the values of said first and second parameters.

16. The method for transferring read image data as claimed in claim 15, wherein said first and second parameters are set in relation to whether the image data is binary-valued or multiple-valued and said reading speed in said sub-scanning direction is set in accordance with the values of said first and second parameters.

17. The method for transferring read image data as claimed in claim 14, wherein said first parameter is set in relation to whether the image data is binary-valued or multiple-valued and said reading speed in said sub-scanning direction is set in accordance with the value of said first parameter.

18. The method for transferring read image data as claimed in claim 13, wherein a first parameter is set in relation to a sub-scanning area and said reading speed in said sub-scanning direction is set in accordance with the value of said first parameter.

19. The method for transferring read image data as claimed in claim 18, wherein said first parameter is set in relation to whether the image data is binary-valued or multiple-valued and said reading speed in said sub-scanning direction is set in accordance with the value of said first parameter.

20. The method for transferring read image data as claimed in claim 13, wherein a first parameter is set in relation to whether the image data is binary-valued or multiple-valued and said reading speed in said sub-scanning direction is set in accordance with the value of said first parameter.

* * * * *

UNITED STATES PATENT AND TRADEMARK OFFICE
CERTIFICATE OF CORRECTION

PATENT NO. : 6,388,777 B1
DATED : May 14, 2002
INVENTOR(S) : Miyajima

It is certified that error appears in the above-identified patent and that said Letters Patent is hereby corrected as shown below:

Title page showing illustrative Figs. should be replaced with the attached title page.

In the drawings replace Figs. 1 and 2 with the attached Figs.

<u>Title page,</u>
Item [73], Assignee, should read -- [73] Assignee: Ricoh Company, Ltd., Tokyo (JP) --

Signed and Sealed this

Nineteenth Day of August, 2003

JAMES E. ROGAN
*Director of the United States Patent and Trademark Office*

(12) United States Patent
Miyajima

(10) Patent No.: US 6,388,777 B1
(45) Date of Patent: May 14, 2002

(54) DIGITAL IMAGE READING APPARATUS

(75) Inventor: Masami Miyajima, Yokohama (JP)

(73) Assignee: Ricoh Corporation, Ltd., Tokyo (JP)

( * ) Notice: Subject to any disclaimer, the term of this patent is extended or adjusted under 35 U.S.C. 154(b) by 0 days.

(21) Appl. No.: 09/210,853

(22) Filed: Dec. 15, 1998

(30) Foreign Application Priority Data

Dec. 15, 1997 (JP) .............................................. 9-344627

(51) Int. Cl.$^7$ .............................. H04N 1/04; H04N 1/32
(52) U.S. Cl. ....................... 358/486; 358/412; 358/442; 358/497; 358/468
(58) Field of Search ................................. 358/412, 413, 358/497, 496, 442, 444, 404, 486, 468

(56) References Cited

U.S. PATENT DOCUMENTS

| | | | | |
|---|---|---|---|---|
| 5,517,331 A | * | 5/1996 | Murai et al. | ................. 358/486 |
| 5,572,335 A | * | 11/1996 | Stevens | ....................... 358/442 |
| 5,825,512 A | * | 10/1998 | Okita | ........................... 358/496 |
| 6,160,636 A | * | 12/2000 | Nagano et al. | ............. 358/412 |

* cited by examiner

*Primary Examiner*—Cheukfan Lee
(74) *Attorney, Agent, or Firm*—Oblon, Spivak, McClelland, Maier & Neustadt, P.C.

(57) ABSTRACT

A digital image reading apparatus including a reading device which reads an original document to obtain image data; a sub-scanning speed setting device which selectively sets a reading speed of the reading device in a sub-scanning direction; a data transfer device which transfers the obtained image data to an external device connected with the digital image reading apparatus with a communications device; a data rate adjusting device which determines a data rate between the digital image reading apparatus and the external device through a communications operation with the external device; and an image parameter setting device which sets at least one parameter relating to a read image on the basis of the communications operation with the external device, wherein, the sub-scanning speed setting device sets the reading speed of the reading device in the sub-scanning direction according to a value of the set parameter relating to the read image determined by the image parameter setting device.

20 Claims, 2 Drawing Sheets